United States Patent [19]

Murakami

[11] Patent Number: 5,740,332
[45] Date of Patent: Apr. 14, 1998

[54] IMAGE FORMING DEVICE

[75] Inventor: Atsushi Murakami, Nagoya, Japan

[73] Assignee: Brother Kogyo Kabushiki Kaisha, Nagoya, Japan

[21] Appl. No.: 701,745

[22] Filed: Aug. 22, 1996

[30] Foreign Application Priority Data

Aug. 22, 1995 [JP] Japan .................. 7-213262

[51] Int. Cl.⁶ ........................................ H04N 1/46
[52] U.S. Cl. .................... 395/108; 358/501; 358/298; 358/524; 358/535
[58] Field of Search .................. 395/108, 109, 395/115; 347/232, 130, 240; 358/535, 298, 501, 502, 401, 524

[56] References Cited

U.S. PATENT DOCUMENTS

| | | | |
|---|---|---|---|
| 4,777,536 | 10/1988 | Kato | 358/298 |
| 4,780,006 | 10/1988 | Hamano | 400/124.07 |
| 5,111,217 | 5/1992 | Zeise | 347/232 |
| 5,124,726 | 6/1992 | Morton et al. | 347/240 |
| 5,300,960 | 4/1994 | Pham et al. | 347/130 |
| 5,347,617 | 9/1994 | Webb et al. | 395/108 |

Primary Examiner—Edward L. Coles, Sr.
Assistant Examiner—Fan Lee
Attorney, Agent, or Firm—Oliff & Berridge, P.L.C.

[57] ABSTRACT

The shift register 43Y is written with four bits of data for recording dots of yellow color, the shift register 43M is written with four bits of data for recording dots of magenta color, the shift register 43C is written with four bits of data for recording dots of cyan color, and the shift register 43Bk is written with four bits of data for recording dots of black color. The recording head 29 is scanned relative to the recording paper 33 in dot intervals D in a scanning direction. In the recording head 29, the recording units 30Y, 30M, 30C, and 30Bk for recording the four colors are aligned in the scanning direction with an interval P equal to a sum of one dot interval D and a multiple of four dot intervals 4D. With this arrangement, the shift registers 43 are supplied with the four bits of data at timings shifted from one another by an amount corresponding to one recording timing period T. Each recording unit will select and record one bit of data out of the four bits of data stored in the corresponding shift register. Positions in the shift registers, from which the respective recording units select their data, are shifted from one another. Accordingly, data processes for the four colors are distributed uniformly amongst all the recording timings.

17 Claims, 12 Drawing Sheets

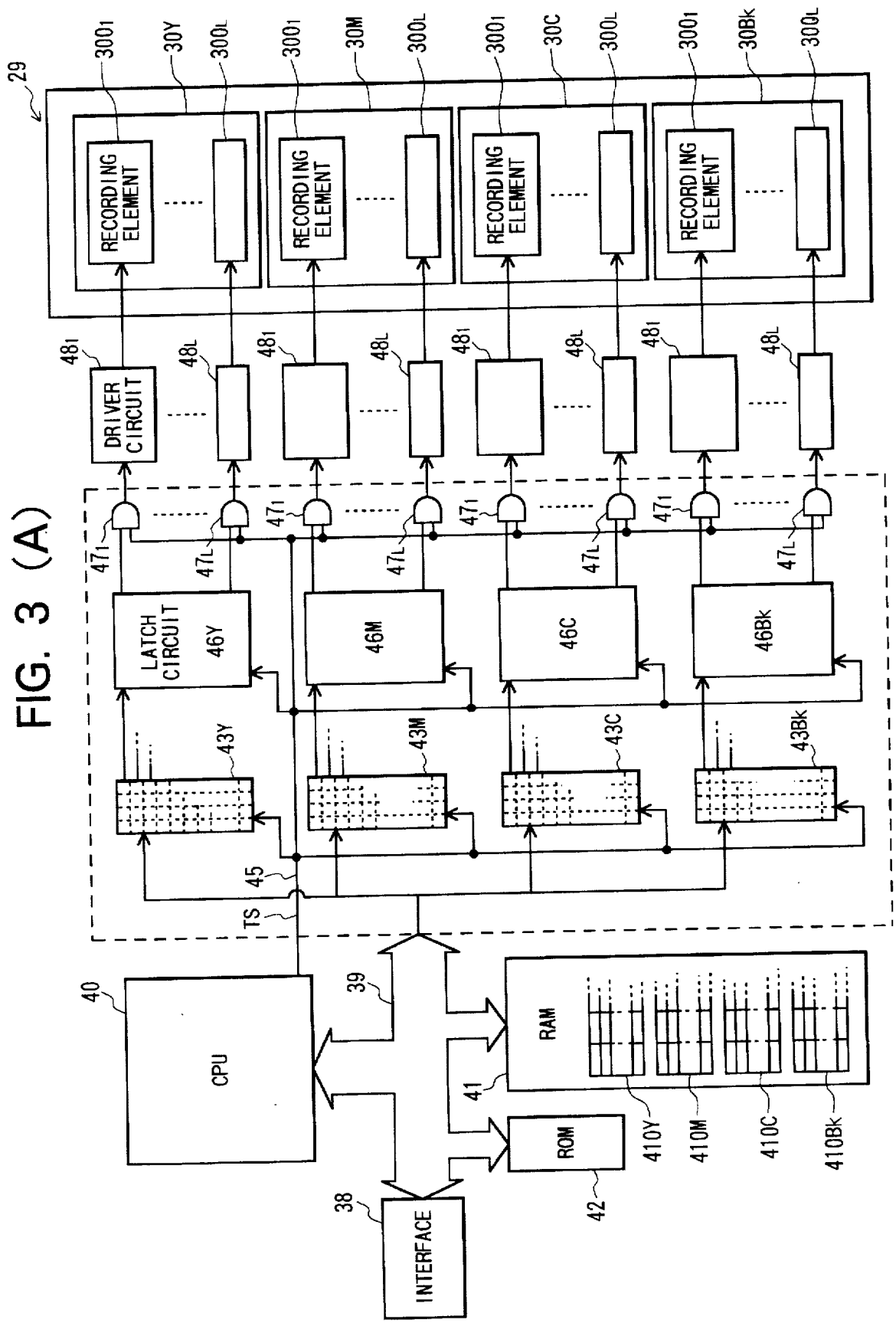

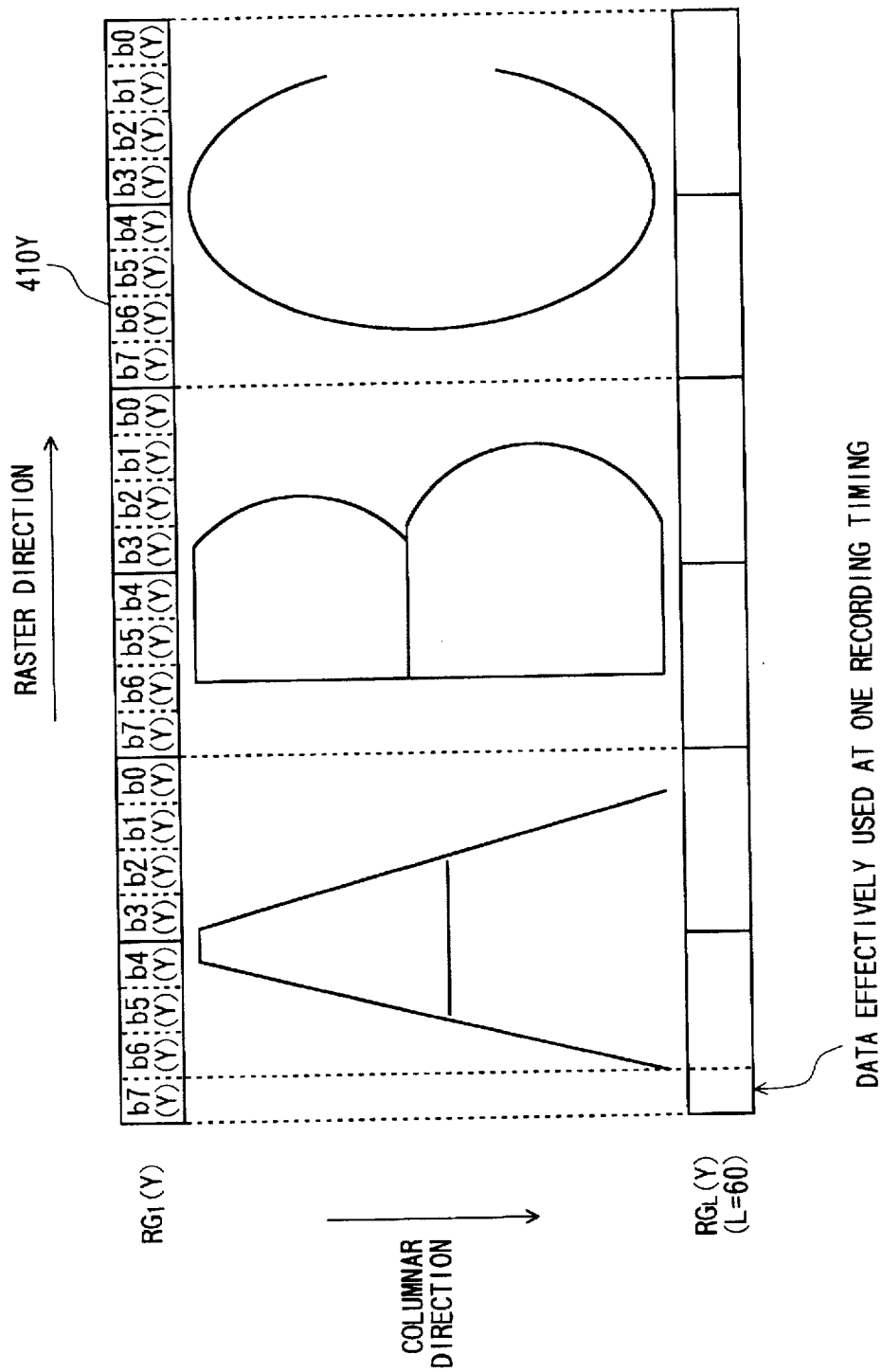

FIG. 4 (B)

RASTER DIRECTION →

410M

RG1(M): b7:b6:b5:b4:b3:b2:b1:b0 (M)(M)(M)(M)(M)(M)(M)(M)

RGL(M) (L=60)

← DATA EFFECTIVELY USED AT ONE RECORDING TIMING

COLUMNAR DIRECTION →

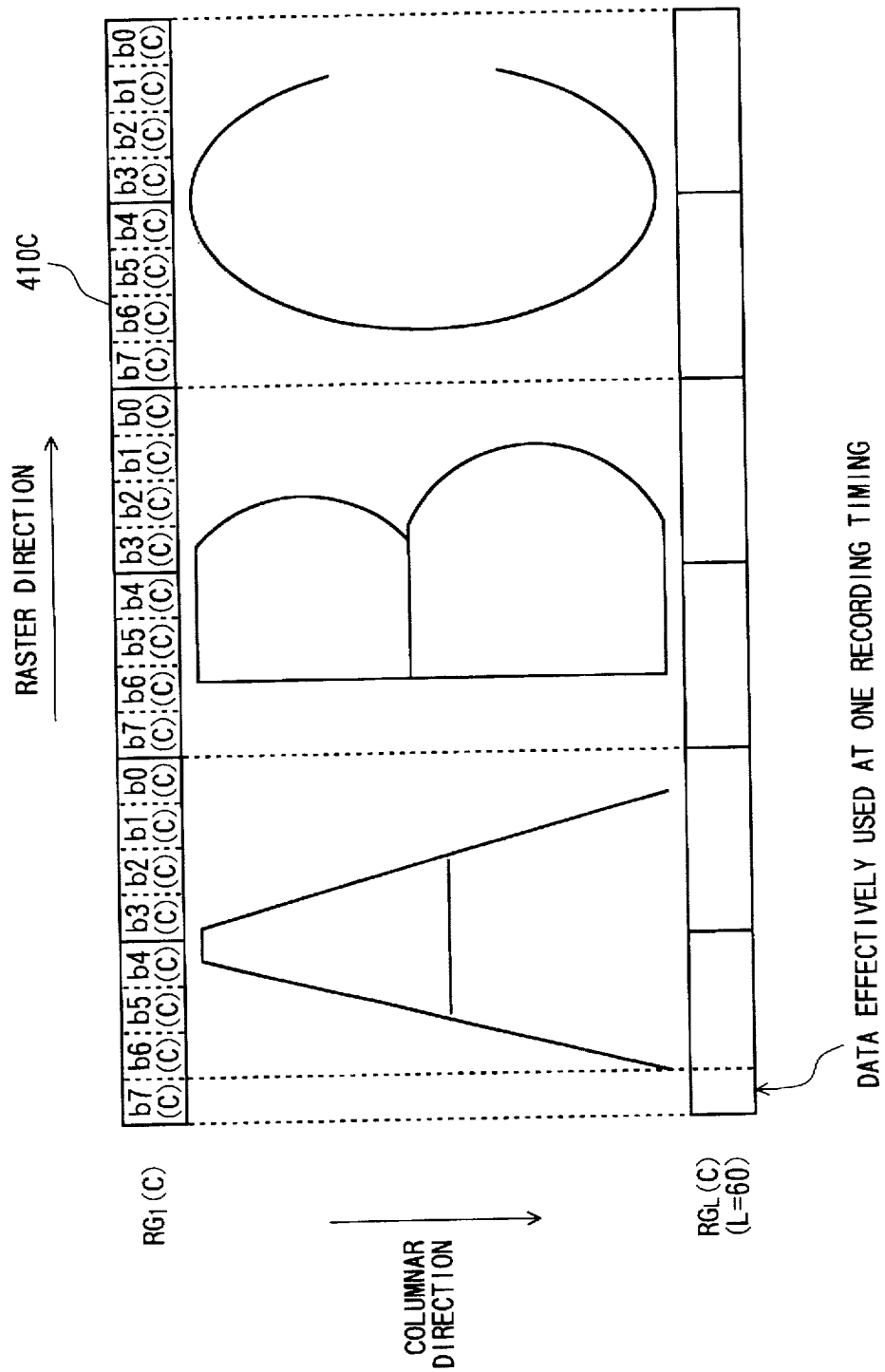

1

IMAGE FORMING DEVICE

BACKGROUND OF THE INVENTION

1. Field of the Invention

The present invention relates to an image forming device in which a recording head and a recording medium are scanned relative to each other and in which the recording head performs a dot matrix type recording operation on the recording medium. More particularly, the present invention relates to an image forming device such as a multicolor image forming device in which a plurality of recording elements are aligned in a scanning direction.

2. Description of the Related Art

There is proposed a serial type image forming device wherein a recording head and a recording medium are scanned relatively to each other in a scanning direction. The recording head has a plurality of recording elements aligned in the scanning direction. For example, a multicolor ink jet recording head has four nozzles for recording yellow (Y), magenta (M), cyan (C), and black (Bk) color dots. The four nozzles are arranged in the scanning direction at an equal interval.

SUMMARY OF THE INVENTION

It is conceivable that the recording head is provided with a buffer memory. The recording head is also provided with four storage devices, such as four shift registers, in correspondence with the four nozzles. A series of raster data is supplied to the recording head. The series of raster data is temporarily stored in a buffer memory. The series of raster data includes a plurality of pieces of dot data to be recorded in the scanning direction.

From the buffer memory, one byte (eight bits) of data is retrieved at a time for each color. Out of the thus retrieved one byte of data, only several bits of data (for example, four bits of data) are set in the shift register provided for the corresponding recording nozzle. The four bits of data thus set in the shift register are retrieved bit one by one in synchronization with timing signals and recorded by the corresponding nozzle. The recording head is successively or repeatedly scanned by a dot interval D in the scanning direction each time the timing signals are issued. Accordingly, the recording medium is recorded with four dots which are separated from one another by the dot interval D in the scanning direction. When the four bits of data stored in the shift register are thus completely recorded, data for a next four dot-recording operation is supplied to the shift register, based on which the next four dot-recording operation is performed. In more concrete terms, the same set of eight bits of data Is again retrieved from the buffer memory. Out of the retrieved eight bits of data, not-yet recorded four bits of data are set in the shift register. Then, the next four dot-recording operation is achieved with the thus newly-supplied four bits of data.

It is conceivable that the interval P, at which the nozzles are equally arranged in the scanning direction, be set to a multiple of four dot intervals 4D because each shift register can store four bits of data in the raster direction. With this arrangement, all the nozzles will simultaneously complete recording four bits of data stored in the corresponding shift registers. When the four dot-recording operations are thus completed by all the nozzles, 16 dots (four dots per each color) are recorded in total. The 16 dots are aligned along the scanning direction by the same dot interval D. In this case, data for all the colors has to be simultaneously supplied to all the shift registers for the next four dot-recording operation.

2

There is proposed a recording head of a type in which a set of nozzles is provided for each color. Each set of nozzles is constructed from a plurality of nozzles aligned in a direction orthogonal to the scanning direction. The recording head can simultaneously record a plurality of dot lines. The nozzle sets or nozzle lines for the respective colors may be arranged in the scanning direction with an interval equal to the multiple of four dot intervals 4D. In this case, however, it becomes necessary to simultaneously retrieve, from the buffer memory, a large amount of data represented by a product of (eight bits)×(the total number of recording colors)×(the number of nozzles arranged in the direction orthogonal to the scanning direction). This large amount of data has to be processed before the next recording time. It is therefore impossible to shorten the time period between successive recording times in order to process the large amount of data. It is impossible to improve the entire recording speed.

It is therefore, an object of the present invention to overcome the above-described drawbacks, and to provide an improved image forming device which can repeatedly perform a recording operation at a shortened time period and therefore which can record a desired whole image within a short period of time.

In order to attain these and other objects, the present invention provides an image forming device for forming images on a recording medium, the device comprising: a recording head for recording dots in a dot matrix form with a plurality of recording elements; scanning means for scanning one of the recording head and a recording medium relative to each other in dot intervals in a scanning direction, the recording elements being aligned with an interval in the scanning direction; storage means capable of storing a plurality of data sets, each data set being for a corresponding one of the plurality of recording elements, each data set including a predetermined number of dots' worth of recording data which are to be successively supplied to the corresponding recording element and recorded by the corresponding recording element in the scanning direction, the interval, at which the recording elements are aligned along the scanning direction, being different from a multiple of the predetermined number of the dot intervals; and writing means for writing, in the storage means, the data sets for the plurality of recording elements at timings shifted from one another.

According to another aspect, the present invention provides an image forming device for forming images on a recording medium, the device comprising: a recording head for recording dots in a dot matrix form with a plurality of recording elements; scanning means for repeatedly moving one of the recording head and a recording medium relative to each other by a certain dot interval in a scanning direction, the recording elements being aligned with an interval in the scanning direction; buffer memory means for storing recording data to be supplied to the plurality of recording elements; read out means for reading out a plurality of data sets for the plurality of recording elements from the buffer memory at timings shifted from one another, each data set being constructed from a first predetermined number of dots' worth of recording data for a corresponding recording element; and storage means capable of storing a second predetermined number of dots' worth of recording data for each recording element, the second predetermined number being less than the first predetermined number, the storage means storing at least a part of the retrieved first predetermined number of dots' worth of recording data for each recording element, the interval, at which the recording elements are aligned, being different from a multiple of the second predetermined number of the dot intervals.

BRIEF DESCRIPTION OF THE DRAWINGS

The above and other objects, features and advantages of the invention will become more apparent from reading the following description of the preferred embodiments taken in connection with the accompanying drawings in which.

DETAILED DESCRIPTION OF THE PREFERRED EMBODIMENTS

Figure 1:
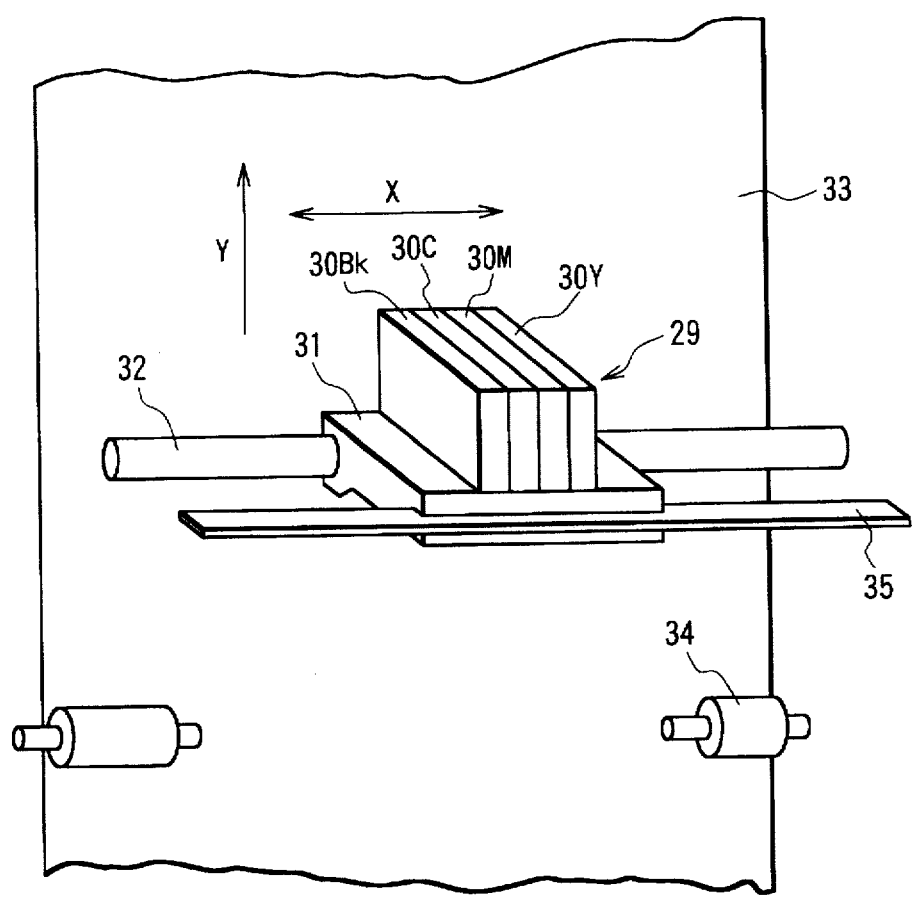
FIG. 1 is a perspective view of an image forming device according to a first embodiment of the present invention.

An image forming device according to preferred embodiments of the present invention will be described while referring to the accompanying drawings wherein like parts and components are designated by the same reference numerals to avoid duplicating description.

A first embodiment of the present invention will be described below with reference to FIGS. 1 through 6.

As shown in FIG. 1, in the image forming device of the first embodiment, a recording head 29 is mounted on a carriage 31. The carriage 31 is slidably supported on a guide rod 32. The guide rod 32 is located in confrontation with a recording paper 33 and extends in a widthwise direction of the recording paper 33. In this example, the guide rod 32 extends in a horizontal direction X. A belt 35 is connected to the carriage 31. The belt 35 is driven by a belt drive source (not shown in the drawings) so that the carriage 31 is reciprocally moved rightward and leftward in the horizontal direction X. The recording head 29 is therefore scanned in the horizontal direction X. It is noted that the belt drive source controls the belt 35 so that the carriage 31 moves successively at a dot interval D of a predetermined amount.

The recording paper 33 is transported by rollers 34 in a direction Y substantially orthogonal to the head scanning direction X. In this example, the recording paper is fed in a vertical direction Y. The rollers 34 are driven by a roller drive source (not shown in the drawings).

It is noted that in the above description, the recording head 31 is scanned relative to the recording paper 33 in the horizontal direction X. The recording paper 33 is fed in the vertical direction Y. However, the recording paper 33 may be scanned in the horizontal direction X, and the recording head 31 may be fed in the vertical direction Y.

Figure 2:
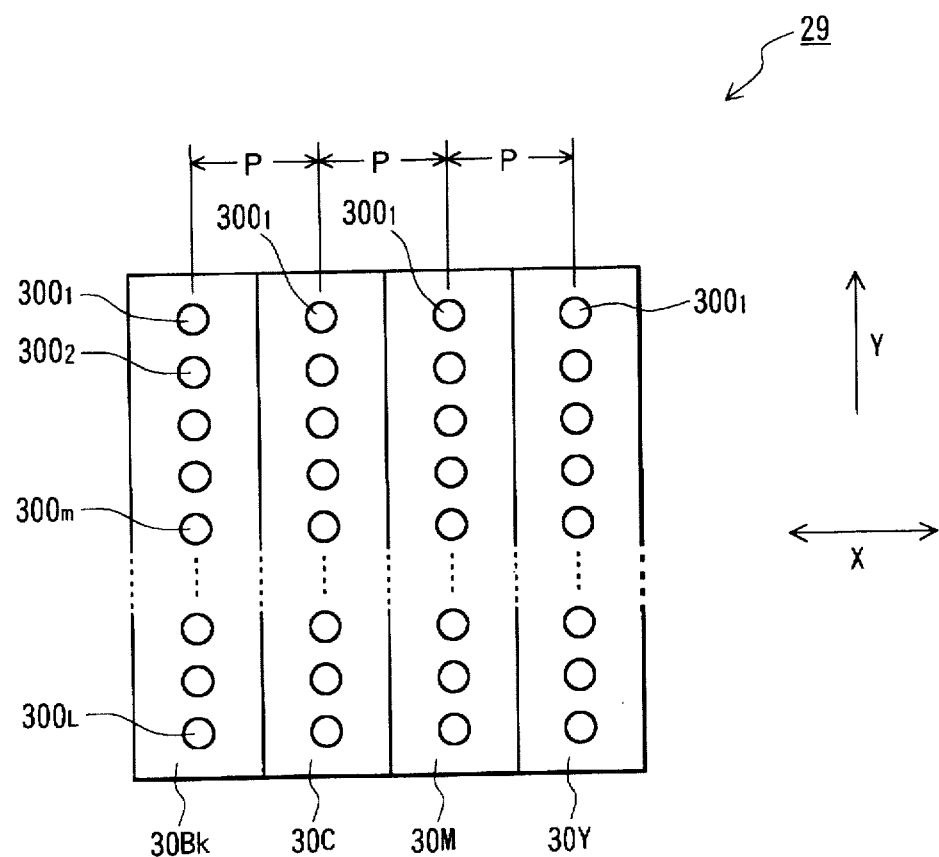
FIG. 2 is a front view of a recording head of the image forming device of FIG. 1.
Figure 3:
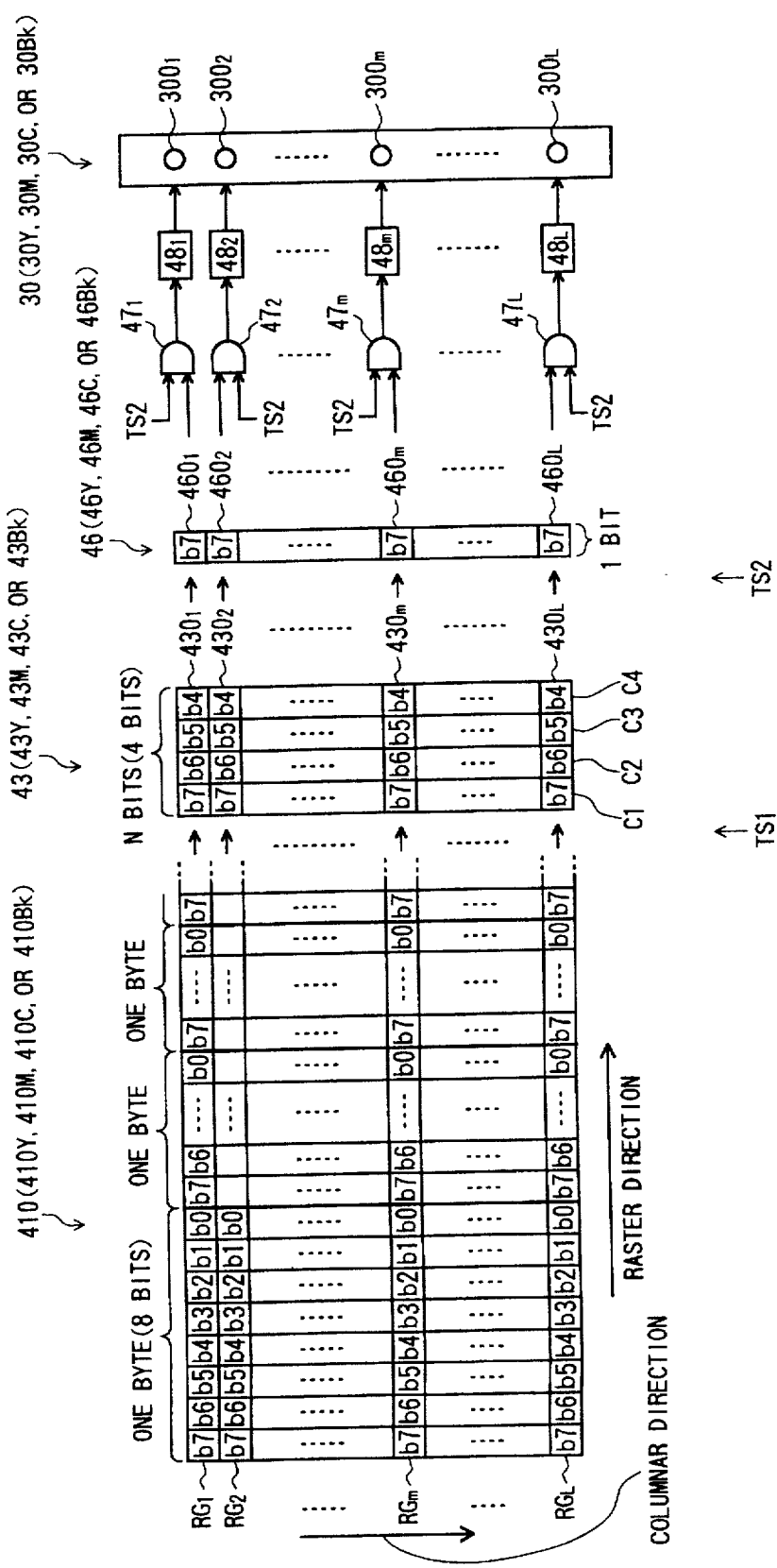
FIG. 3(A) is a block diagram of a control portion of the image forming device of FIG. 1.
FIG. 3(B) illustrates how data is transferred in the control portion of FIG. 3(A), that is, how data for each color is transferred from one buffer memory 410 to a corresponding recording unit 30 via a shift register 43, a latch circuit 46, AND gates 47, and driver circuits 48.
Figure 4:
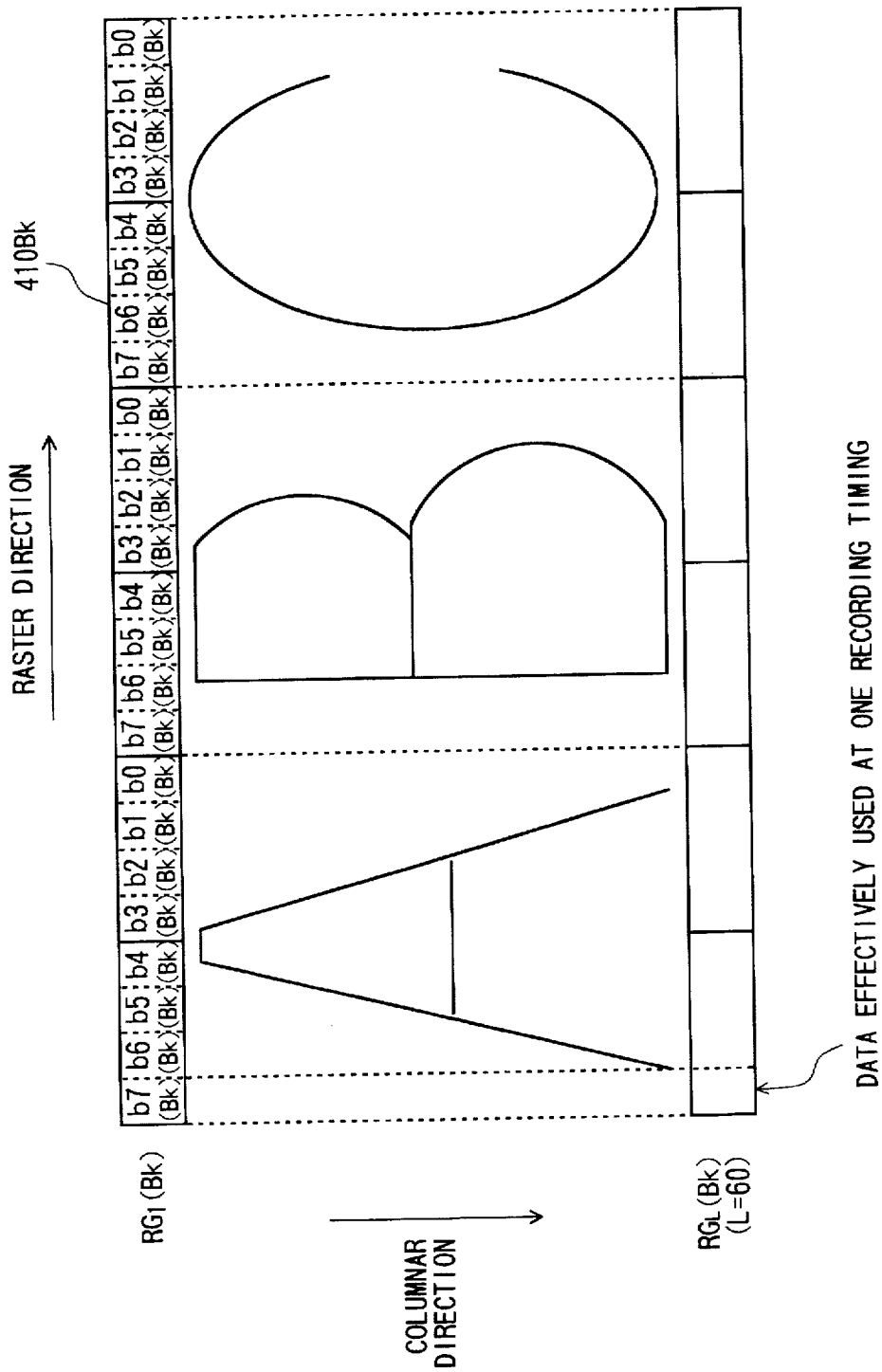
FIGS. 4(A) through 4(D) schematically show buffer memories for four colors in the device of FIG. 3(A), in which FIG. 4(A) schematically shows a buffer memory 410Y for a yellow color, FIG. 4(B) schematically shows a buffer memory 410M for a magenta color, FIG. 4(C) schematically shows a buffer memory 410C for a cyan color, and FIG. 4(D) schematically shows a buffer memory 410Bk for a black color.

As shown in FIG. 2, the recording head 29 includes four recording units 30Y, 30M, 30C, and 30Bk arranged in the scanning direction X. The recording units 30Y, 30M, 30C, and 30Bk are for recording yellow (Y), magenta (M), cyan (C), and black (Bk) color dots, respectively.

Each recording unit 30 (30Y, 30M, 30C, or 30Bk) has "L" number of recording elements 300 ($300_1$ to $300_L$), where L is an integer equal to or higher than one. On each recording unit 30, the recording elements $300_1$ to $300_L$ are aligned in the paper feeding direction Y with an equal interval. The recording elements $300_1$–$300_L$ are therefore aligned in a direction substantially orthogonal to the scanning direction X. It is noted that the recording elements $300_1$ to $300_L$ may be arranged slanted in regards to the sheet feeding direction Y.

Each recording element 300, that is, an m-th recording element $300_m$ ($1 \leq m \leq L$) on the recording unit 30Y is aligned, in the scanning direction X, with corresponding m-th recording elements $300_m$, $300_m$, and $300_m$ on the recording units 30M, 30C, and 30Bk. Thus aligned recording elements $300_m$ on the four recording units 30Y, 30M, 30C, and 30Bk will record one recording line (m-th raster) extending in the scanning direction X. In other words, the first through L-th recording elements $300_1$ to $300_L$ on the four recording units will record "L" number of rasters. For example, the first recording elements $300_1$ on the four recording units 30Y, 30M, 30C, and 30Bk are aligned along the scanning direction X to record a first raster.

On each raster (m-th raster), the m-th recording elements $300_m$ on the four recording units 30Y, 30M, 30C, and 30Bk are arranged with an equal interval P along the scanning direction X. The amount of this interval P is set to a value as defined below:

$$P=(1D)+(\text{a multiple of } ND),$$

where "D" is the dot interval, and "N" is the number of bit data which can be stored in a shift register 43 provided to each recording element 30 as will be described later. Accordingly, the interval P may be set to either one of the values: (N+1)D, (2N+1)D, (3N+1)D .... In other words, the interval P is set to a sum of one dot interval D and a multiple of N dot intervals ND.

The recording head 29 is preferably of an ink jet type. The recording elements 300 of each recording unit 30 are constructed from nozzles for ejecting ink droplets of a corresponding color.

As shown in FIG. 3(A), a control portion of the image forming device has a CPU 40, a ROM 42, and a RAM 41 which are connected with one another via a bus line 39.

Data for recording a color image is supplied in a raster format to the image forming device from a host computer (not shown in the drawings). The recording data is inputted to the image forming device via an input interface 38 connected to the bus line 39. The recording data is constructed from four sets of data for recording yellow, magenta, cyan, and black color components of the color image. The RAM 41 is formed with four buffer memory areas 410 (410Y, 410M, 410C, and 410Bk) each for temporarily storing a data set of a corresponding color component.

The ROM 42 stores therein a control program for controlling the recording head 29 to print recording data as will be described later. The CPU 40 is for controlling the entire image forming device. In more concrete terms, the CPU 40 transfers the inputted four sets of color data from the interface 38 to the buffer memory areas 410Y, 410M, 410C, and 410Bk. The CPU 40 outputs timing signals TS through a timing signal line 45. Timing signals TS are for determining a time interval or time period T at which the recording elements 300 repeatedly record data onto the paper 33. As will be described later, the recording elements 300 will record data in synchronization with the timing signals TS. The CPU 40 also controls the belt drive source to move the head 31 in dot intervals D in synchronization with the timing signals TS. The CPU 40 further controls the roller drive source to feed the recording paper 33.

The control portion is further provided with four shift registers 43 (43Y, 43M, 43C, and 43Bk) each for storing data of a corresponding color. The shift registers 43 are connected to the bus line 39. The four shift registers 43 (43Y, 43M, 43C, and 43Bk) are respectively connected to four latch circuits 46 (46Y, 46M, 46C, and 46Bk). Each latch circuit 46 (46Y, 46M, 46C, or 46Bk) is connected to a corresponding recording unit 30 (30Y, 30M, 30C, or 30Bk) via "L" number of AND gates $47_1$ to $47_L$ and "L" number of driver circuits $48_1$ to $48_L$. That is, "L" number of AND gates $47_1$ to $47_L$ are connected to each latch circuit 46 (46Y, 46M, 46C, or 46Bk). "L" number of driver circuits $48_1$ to $48_L$ are provided in one to one correspondence to the "L" number of AND gates $47_1$ to $47_L$. Each driver circuit $48_m$ ($1 \leq m \leq L$) is for driving a m-th recording element $300_m$ ($1 \leq m \leq L$) on a corresponding recording unit 30. The timing signal line 45 is connected between the CPU 40 and the shift registers 43 (43Y, 43M, 43C, or 43Bk), the latch circuits 46 (46Y, 46M, 46C, or 46Bk), and the AND gates $47_m$ ($1 \leq m \leq L$).

With this structure, data for each color is transferred from the corresponding buffer memory area 410 to the corresponding shift register 43. The data will be further transferred to the corresponding latch circuit 46 and then to the corresponding AND gates $47_1$ to $47_L$. Based on the supplied data and the timing signals TS, the AND gates $48_1$ to $48_L$ will control the corresponding driver circuits $48_1$ to $48_L$ to drive the recording elements $300_1$ to $300_L$ of the corresponding recording unit 30. For example, data for yellow color is transferred from the buffer memory area 410Y to the shift register 43Y. The data will be further transferred to the latch circuit 46Y and then to the corresponding AND gates $47_1$ to $47_L$. Based on the supplied data and the timing signals TS, the AND gates $48_1$ to $48_L$ will control the corresponding driver circuits $48_1$ to $48_L$ to drive the recording elements $300_1$ to $300_L$ of the recording unit 30Y.

The buffer memory areas 410, the shift registers 43, the latch circuits 46, the AND gates 47, and the driver circuits 48 will be described below in greater detail.

As shown in FIG. 3(B), the data set for each color is constructed from an "L" number of raster data groups $RG_1$ to $RG_L$. The raster data groups $RG_1$ to $RG_L$ are arranged in a columnar direction. Each raster data group $RG_m$ ($1 \leq m \leq L$) is constructed from a series of data bits which are arranged in a raster direction orthogonal to the columnar direction. In Other words, each raster data group $RG_m$ (m-th raster data group $RG_m$) includes a plurality of bits of data in one to one correspondence with a plurality of dots which are to be recorded along the scanning direction X by a corresponding m-th recording element $300_m$ of a corresponding recording unit 30. It is noted that the series of data bits in each raster data group $RG_m$ are constructed from a plurality of sets of one byte (eight bits) data which are arranged in the raster direction. Each one byte data is constructed from eight bits of data "b7" to "b0."

As shown in FIG. 3(B), a shift register 43 for each color has a length along the columnar direction equivalent to the "L" number of bits. In other words, the shift register 43 has the "L" number of raster storage portions $430_1$ to $430_L$ arranged in the columnar direction. The shift register 43 has a width along the raster direction equivalent to a predetermined number "N" of bits, where "N" is an integer higher than 1. Accordingly, the shift register 43 can store the "N" number of bits of data in each raster storage portion $430_m$ ($1 \leq m \leq L$). For example, the number "N" may be set to four. The shift register 43 can therefore store four bits of data in each raster storage portion $430_m$. With this structure, four bits of data will be transferred at a time from each raster data group $RG_m$ to a corresponding raster storage portion $430_m$ (m-th storage portion).

The CPU 40 serves to transfer data from each raster data group $RG_m$ to the corresponding raster storage portion $430_m$. In more concrete terms, the CPU 40 is designed to read out one byte (eight bits) of data "b7" to "b0" at a time from one raster data group $RG_m$. Because the shift register 43 can store only four bits of data in each raster, only a front half (four bits) of the retrieved eight bits of data can be stored in the corresponding raster storage portion $430_m$, while a remaining rear half is left unused. As will be described later, four dots will be recorded with the thus stored front half four bits of data by the corresponding recording element $300_m$. Thereafter, the same eight bits of data are again retrieved from the raster data group $RG_m$, and the rear half four bits are set in the raster storage portion $430_m$. In other words, eight bits of data are read out from the buffer memory area 410 in each raster. Out of the retrieved data set, a front half and a rear half are inputted to the corresponding raster of the shift register 43 in this order.

Next will be given a more detailed explanation of the manner how the CPU 40 transfers data from the buffer memory area 410 to the corresponding shift register 43.

When a timing signal TS (first timing signal TS1) is issued, the CPU 40 first retrieves eight bits of data "b7" to "b0" from a first raster data group $RG_1$. Out of the retrieved eight bits of data, four bits "b7" to "b4" are stored in the first raster storage portion $430_1$ as shown in FIG. 3(B). The CPU 40 then retrieves eight bits of data "b7" to "b0" from a second group $RG_2$, out of which four bits of data "b7"–"b4" are set in the second storage portion $430_2$. The CPU 40 then retrieves eight bits of data "b7"–"b0" from a third group $RG_3$, out of which four bits of data "b7"–"b4" are set in the third storage portion $430_3$. Thus, the CPU 40 successively supplies the shift register 43 with data sets from the "L" number of raster data groups $RG_1$ to $RG_L$, each data set being constructed from four bits of data. As a result, the shift register 43 is stored with four columns of data C1 through C4, each column extending in the columnar direction and being constructed from "L" number of bits of data. That is, the first column C1 is constructed from the "L" number of "b7" bit data supplied from the raster data groups $RG_1$ to $RG_L$. The second through fourth columns C2–C4 are constructed from "b6" bit data, "b5" bit data, and "b4" bit data, respectively.

Each latch circuit 46 has the "L" number of storage areas $460_1$ to $460_L$ arranged in the columnar direction. Each storage area $460_m$ ($1 \leq m \leq L$) can store only one bit. The latch circuit 46 can therefore store the "L" number of bits of data. With this structure, the four columns C1–C4 stored in the shift register 43 are supplied column one by one to the latch circuit 46 in response to timing signals TS. Accordingly, when a timing signal (second timing signal) TS2 is issued subsequent to the first timing signal TS1, the first column C1 is supplied to the latch circuit 46.

From the latch circuit 46, the "L" number of "b7" bits, which constitute the one column C1, are supplied to the "L" number of AND gates $47_1$ to $47_L$, respectively. The timing signal (TS2, in this case) is also inputted to each AND gate $47_m$ ($1 \leq m \leq L$). Accordingly, each AND gate $47_m$ will output an energization signal to the corresponding driver circuit $48_m$ if the supplied timing signal TS2 and the supplied bit data "b7" are both energized. With the energization signal, the driver circuit $48_m$ drives the corresponding recording element $300_m$ to eject ink droplets of a corresponding color. As a result, each recording element $300_m$ records a dot or non-dot in accordance with the bit data "b7" supplied from the corresponding raster data group $RG_m$.

When a timing signal (third timing signal) TS3 is issued subsequent to the signal TS2, the next column C2 is supplied from the shift register 43 to the latch circuit 46. As a result, each recording element $300_m$ records a dot or non-dot in accordance with the bit data "b6" supplied from the corresponding raster data group $RG_m$. Thus, as the second through fifth timing signals TS2–TS5 are successively issued, each recording element $300_m$ successively records dots or non-dots in accordance with the bit data "b7"–"b4" supplied from the corresponding raster data group $RG_m$. The dots or non-dots thus printed according to the bits of data "b7"–"b4" by the same recording element $300_m$ are separated from one another by the dot interval D in the scanning direction X because the head 29 repeatedly moves by one dot interval D in response to the timing signals TS.

When the timing signal TS5 is issued and the fourth dot or non-dot is recorded on the paper 33, the CPU 40 again retrieves the eight bits of data "b7"–"b0" from each raster data group $RG_m$ in the same manner as described above. The eight bits of data are the same as those that have been retrieved in response to the timing signal TS1. At this time, the CPU 40 writes the rear half four bits "b3"–"b0" to the corresponding raster storage portion $430_m$. Then, in the same manner as described above, each recording element $300_m$ records the corresponding bits of data "b3"–"b0" in response to subsequent timing signals TS6–TS9. Thus, in response to the timing signals TS, each recording element $300_m$ successively records dots or non-dots according to the bits of data supplied from the corresponding raster data group $RG_m$. The recording element $300_m$ therefore produces a m-th raster or recording line extending in the scanning direction X based on the corresponding raster data group $RG_m$.

To summarize, in order to record each recording line (m-th raster), four bits of data are transferred all at once from a m-th raster data group $RG_m$ to the m-th raster storage portion $430_m$. The four bits of data are then successively transferred to the m-th storage area $460_m$, based on which the m-th recording element $300_i$ records dots or non-dots on the paper 33. Simultaneously when the fourth bit of data is recorded, the subsequent four bits of data are transferred to the m-th raster storage portion $430_m$. In all the "L" number of rasters, the above-described operations are performed almost at the same timing.

Data for all the yellow, magenta, cyan, and black colors are processed in the same manner as described above. Accordingly, the head 29 records the "L" number of multicolor recording lines, each extending in the scanning direction X. It is noted, however, that data for the four colors are transferred from the buffer memories 410Y, 410M, 410C, and 410Bk to the shift registers 43Y, 43M, 43C, and 43Bk at different timings because the interval P is set satisfying the following equation:

$P=1D+$(a multiple of $ND$)

A mechanism how to transfer data of the four colors will be described below with reference to an example.

In this example, it will be assumed that the image forming device is supplied with data for recording multicolored letters "A," "B," and "C." The data is constructed from four sets of data for recording yellow, magenta, cyan, and black color components of those letters "A," "B," and "C." As shown in FIGS. 4(A)–4(D), the four sets of data are stored in the buffer memories 410Y, 410M, 410C, and 410Bk, respectively. In this example, each recording unit 30 has sixty (L=60) recording elements 300. Accordingly, each buffer memory area 410 stores therein sixty raster data groups $RG_1$–$RG_{60}$, each group being comprised of a plurality of bit data arranged along the raster direction.

For simplicity and clarity, only the first raster group $RG_1$ is shown in each drawing FIGS. 4(A)–4(D). As apparent from FIG. 4(A), the first raster group $RG_1(Y)$ for yellow color is constructed from: eight bits of data "b7(Y)" to "b0(Y)" for recording a first raster part of the letter A; eight bits of data "b7(Y)" to "b0(Y)" for recording a first raster part of the letter B; and eight bits of data "b7(Y)" to "b0(Y)" for recording a first raster part of the letter C. Similarly, as shown in FIG. 4(B), the first raster group $RG_1(M)$ for magenta color is constructed from: eight bits of data "b7(M)" to "b0(M)" for the letter A; eight bits of data "b7(M)" to "b0(M)" for the letter B; and eight bits of data "b7(M)" to "b0(M)" for the letter C. As shown in FIG. 4(C), the first raster group $RG_1(C)$ for cyan color is constructed from: eight bits of data "b7(C)" to "b0(C)" for the letter A; eight bits of data "b7(C)" to "b0(C)" for the letter B; and eight bits of data "b7(C)" to "b0(C)" for the letter C. As shown in FIG. 4(D), the first raster group $RG_1(Bk)$ for black color is constructed from: eight bits of data "b7(Bk)" to "b0(Bk)" for the letter A; eight bits of data "b7(Bk)" to "b0(Bk)" for the letter B; and eight bits of data "b7(Bk)" to "b0(Bk)" for the letter C.

Figure 5:
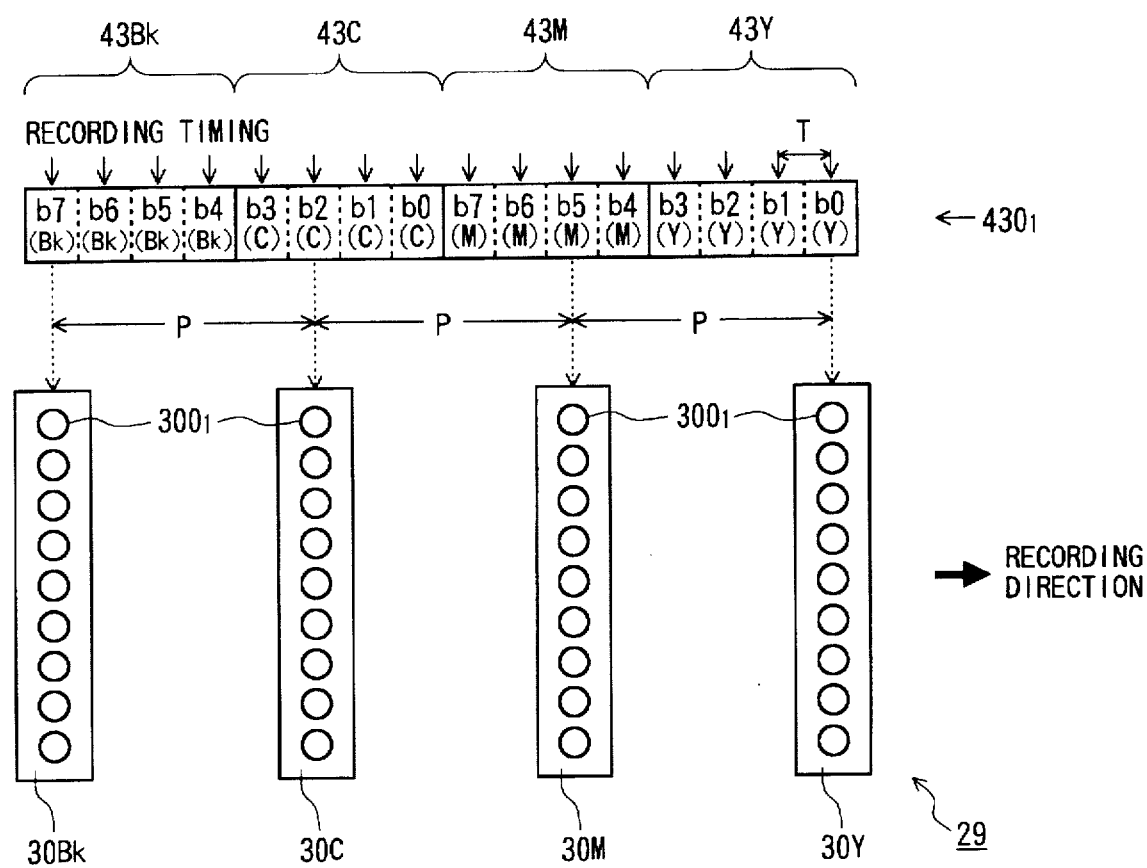
FIG. 5 schematically shows a relationship between recording units 30Y, 30M, 30C, and 30Bk in the head 29 of FIG. 2 and shift registers 43Y, 43M, 43C, and 43Bk shown in FIG. 3(A)

In this example, as shown in FIG. 5, the interval P is set to a five-dot interval 5D, that is, a sum of one dot interval and four dot intervals.

FIG. 5 also shows how data in the first raster is transferred from the buffer memories 410 to the shift registers 43 and then recorded by the recording units 30. In more concrete terms, FIG. 5 shows how data from the first raster groups in the buffer memories 410Y, 410M, 410C, and 410Bk are transferred and stored into the first storage portions $430_1$ of the shift registers 43Y, 43M, 43C, and 43Bk and then used by the first recording elements $300_1$ of the recording units 30Y, 30M, 30C, and 30Bk.

At one instance of FIG. 5, four bits of data "b7(Bk)"–"b4 (Bk)" for a black color component of the letter "A" are stored in the first storage portion $430_1$ of the shift register 43Bk. Four bits of data "b3(C)"–"b0(C)" for a cyan color component of the letter "A" are stored in the first storage portion $430_1$ of the shift register 43C. Four bits of data "b7(M)"–"b4(M)" for a magenta color component of the letter "B" are stored in the first storage portion $430_1$ of the shift register 43M. Four bits of data "b3(Y)"–"b0(Y)" for a yellow color component of the letter "B" are stored in the first storage portion 430₁ of the shift register 43Y.

When a timing signal TS is issued in this condition, the data bit "b0(Y)," that is stored last of the four bits in the shift register 43Y, is outputted to the latch circuit 46Y, and recorded by the recording element 300₁ of the recording unit 30Y. At the same time, the data bit "b5(M)," that is stored third of the four bits in the shift register 43M, is outputted to the latch circuit 46M, and recorded by the recording element 300₁ of the recording unit 30M. The data bit "b2(C)," that is stored second of the four bits in the shift register 43C, is outputted to the latch circuit 46C, and recorded by the recording element 300₁ of the recording unit 30C. The data bit "b7(Bk)," that is stored first of the four bits in the shift register 43Bk, is outputted to the latch circuit 46Bk, and recorded by the recording element 300₁ of the recording unit 30Bk.

Thus, at every recording timing determined by the timing signal TS, all the recording units 30Y, 30M, 30C, and 30Bk perform recording operations with data supplied from the corresponding shift registers 43Y, 43M, 43C, and 43Bk. Positions in the shift registers 43Y, 43M, 43C, and 43Bk from which data is transferred to the recording units 30Y, 30M, 30C, and 30Bk are shifted from one another by one bit in the raster direction.

After completing the above-described recording operation, the recording unit 30Y will need to store the next series of data "b7(Y)" to "b4(Y)" for the letter "C" before the subsequent timing signal is issued. It is noted, however, that the recording unit 30M will perform a subsequent recording operation with the next bit data "b4(M)" which is already stored in the shift register 43M next to the bit data "b5(M)." Similarly, the recording unit 30C will perform a subsequent recording operation with the already-stored bit data "b1(C)." The recording unit 30Bk will perform a subsequent recording operation with the already-stored bit data "b6(Bk)." Accordingly, it is unnecessary to write subsequent sets of data to the shift registers 43M, 43C, and 43Bk. After the next recording operation, the shift register 43M will need to be supplied with the next set of data "b3"–"b0" for the letter "B."

Accordingly, at the same time of the above-described printing operation with the condition shown in FIG. 5, the CPU 40 retrieves, from the buffer memory area 410Y, eight bits of data "b7(Y)"–"b0(Y)" for the yellow color component of the letter "C". The CPU 40 then writes the shift register 43Y with four bits "b7(Y)" to "b4(Y)" out of the retrieved data "b7(Y)" to "b0(Y)."

Then, at the further next timing, when each recording unit performs recording operation with data subsequent to the latest-recorded data, the CPU 40 retrieves, from the buffer memory area 410M, eight bits of data "b7(M)"–"b0(M)" for the magenta color component of the letter "B". The CPU 40 then writes four bits "b3(M)" to "b0(M)" out of the retrieved data "b7(M)" to "b0(M)" in the shift register 43M. As apparent from the above description, the position in the buffer memory 410M, from which the CPU 40 now transfers the four bits of data to the shift register 43M, is shifted by four bits of data from the position in the buffer memory 410Y, from which the CPU 40 has transferred the bits of data "b7(Y)"–"b4(0)" to the shift register 43Y at the last timing.

Figure 6:
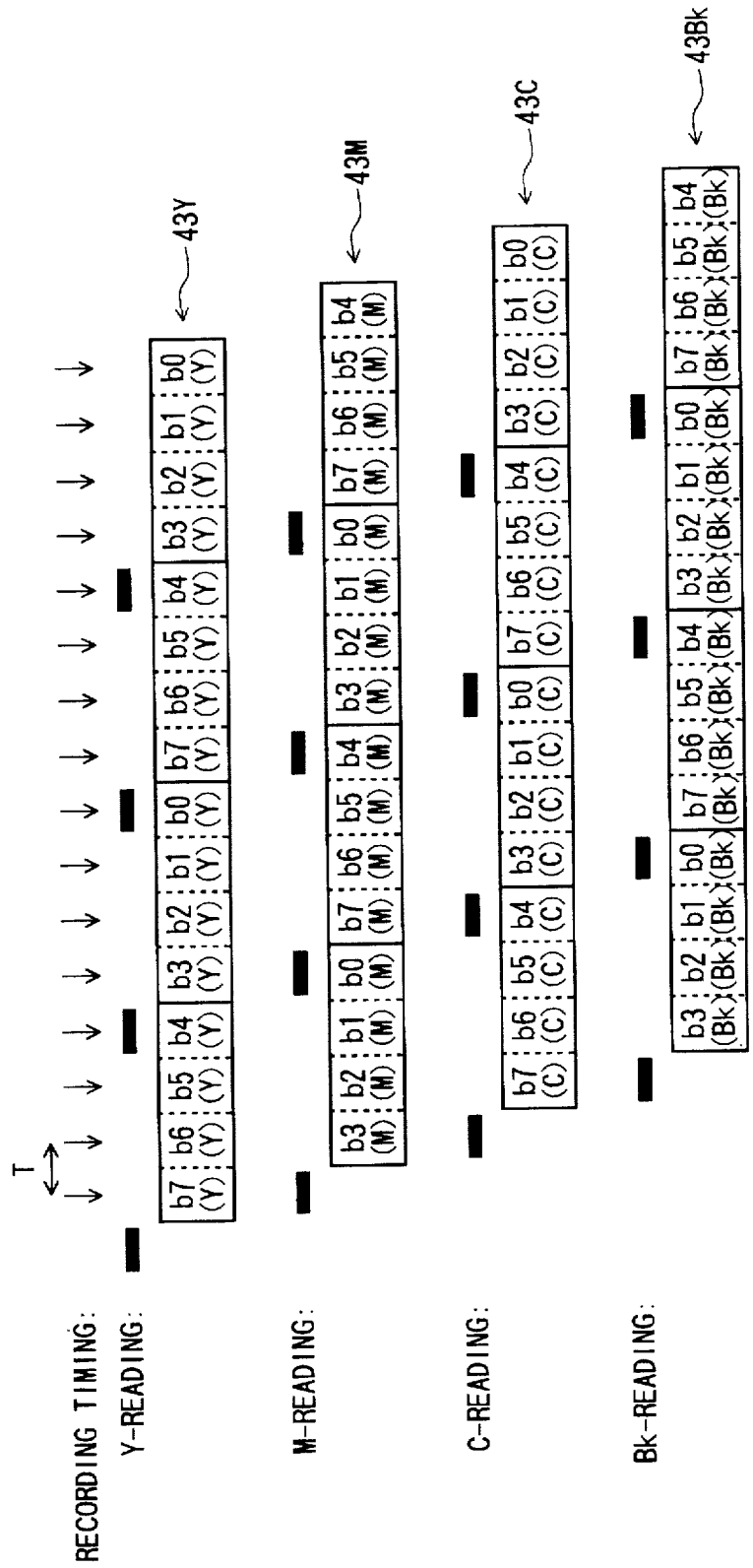
FIG. 6 schematically shows a writing timing at which data is written in the shift registers 43Y, 43M, 43C, and 43Bk.

Thus, timings at which data for the respective colors are retrieved from the buffer memories 410 and written to the corresponding shift registers 43 are shifted by one recording time period T as indicated by black marks in FIG. 6. The positions in the buffer memories, from which data for the respective colors are transferred to the shift registers, are shifted by four bits of data as apparent from FIG. 6.

It is noted that the above-description is given only to the recording operation in the first raster. However, the same operation is performed for all the rasters almost at the same timing.

As described above, according to the present embodiment, at every recording timing, data transferring operation from the buffer memory area 410 to the shift registers 43 is performed only for one of the four colors. Accordingly, data processes for all the colors will not be performed at a single recording timing. Processes for the colors are distributed amongst all the recording timings. It is therefore possible to shorten the recording time period between successive recording timings, and to enhance the entire recording speed.

As described above, according to the present embodiment, in each raster, the shift register 43Y is written with four bits of data for recording yellow dots, the shift register 43M is written with four bits of data for recording magenta dots, the shift register 43C is written with four bits of data for recording cyan dots, and the shift register 43Bk is written with four bits of data for recording black dots. The recording head 29 repeatedly moves at the dot intervals D in the scanning direction X in response to the timing signals TS. The recording units 30Y, 30M, 30C, and 30Bk provided in the recording head 29 for recording the four colors are aligned in the scanning direction X with an interval P. The interval P has a value equal to a sum of one dot interval and four (N) dot intervals.

With this arrangement, at every recording timing, each recording unit 30 is driven with one dot worth of data selected out of the four dots of data stored in the corresponding shift register 43. All the recording units 30Y, 30M, 30C, and 30Bk perform the one dot recording operation simultaneously. Positions in the shift registers 43Y, 43M, 43C, and 43Bk, from which data is selected to be supplied to the corresponding recording units 30Y, 30M, 30C, and 30Bk, are shifted from one another. In other words, the recording units are driven with data selected from different positions in the corresponding shift registers. The shift registers 43Y, 43M, 43C, and 43Bk are supplied with the four-bit data sets at timings shifted from one another by one recording time period T. The positions in the buffer memories 410Y, 410M, 410C, and 410Bk, from which the four-bit data sets for the corresponding colors are transferred to the shift registers 43Y, 43M, 43C, and 43Bk, are shifted from one another by four (N) bits of data. This shift amount therefore corresponds to the interval P. Data processes for all the colors are therefore distributed uniformly amongst all the recording timings.

Figure 7:
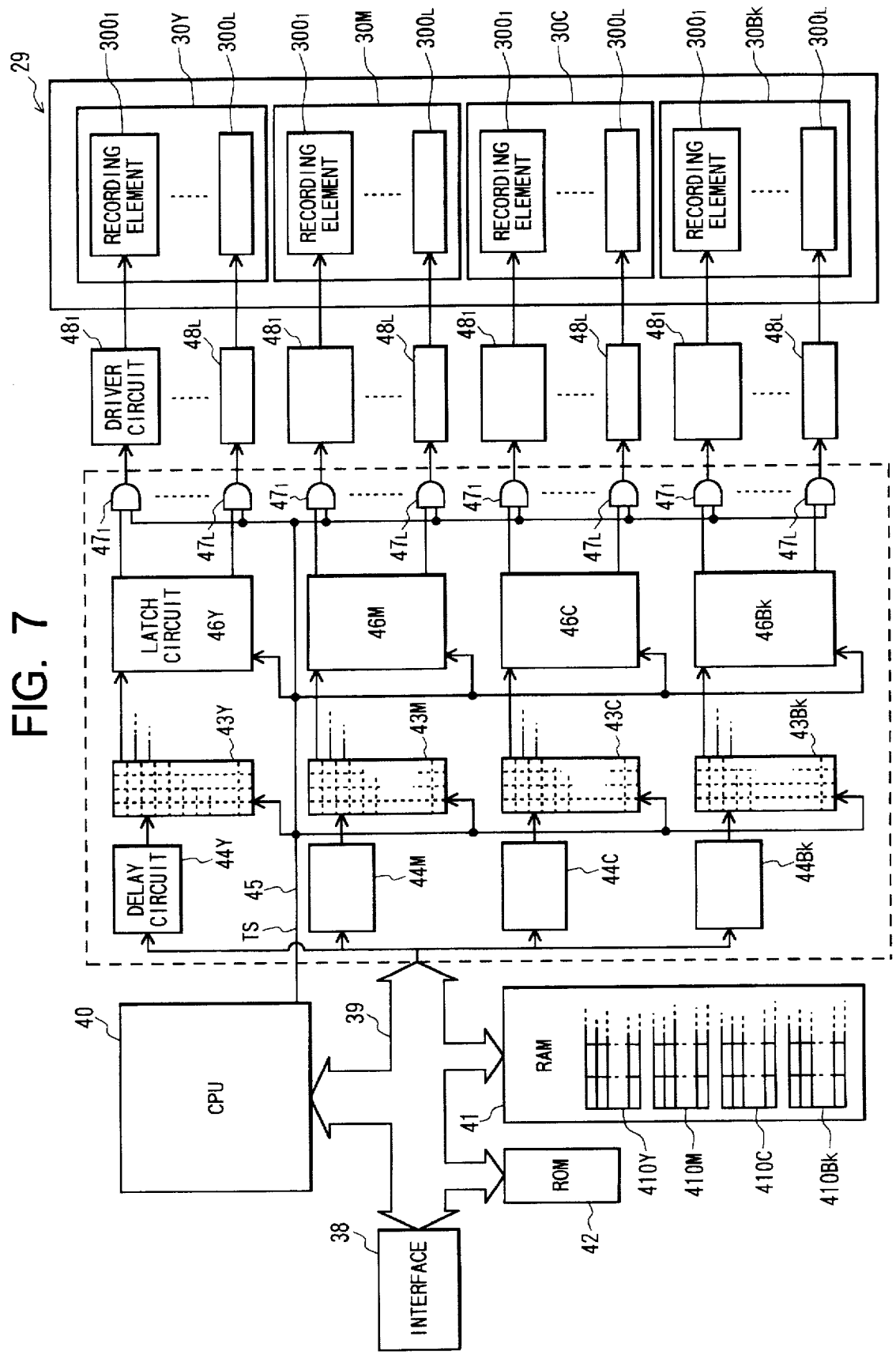
FIG. 7 is a block diagram showing a second embodiment of a control portion of the image forming device of FIG. 1.

A second embodiment of the image forming device of the present invention will be described below with reference to FIGS. 7 and 8.

In the above-described first embodiment, the CPU 40 retrieves data for the respective recording units 30 from the buffer memory areas 410 at positions corresponding to the interval P. Contrarily, according to the present embodiment, delay circuits 44Y, 44M, 44C, and 44Bk are provided for creating a delay time corresponding to a multiple of the "N" dot intervals ND, that is, a multiple of the "N" number of recording time periods NT.

Also in this embodiment, the interval P is set to a sum of (1D) and (a multiple of ND), that is, a sum of one dot interval and a multiple of N dot intervals. Also, according to the present embodiment, the CPU 40 retrieves data for all the recording units at timings shifted from one another by one recording period T. Contrary to the first embodiment, the positions in the buffer memories 410, from which data for the respective colors are retrieved, are the same as one another. The CPU 40 then outputs the retrieved data to the delay circuits 44Y, 44M, 44C, and 44Bk. Each delay circuit produces a delay with regards to an adjacent delay circuit. The amount of the delay corresponds to the multiple of the N dot distances ND, that is, the multiple of the N recording periods NT.

For example, when the interval P is selected as a five-dot interval (D+4D) as in the example described in the first embodiment, the delay amount may be set to four recording time periods 4T (=NT where N=4). After producing the delay, each delay circuit 44 outputs data to the corresponding shift register 43. Accordingly, each shift register 43 will be recorded with data in the same manner as in the first embodiment.

For example, each delay circuit 44 may be constructed from a shift register. The delay circuit 44Y may not be provided to the shift register 43Y. The delay circuit 44M may be constructed from a shift register which has the same structure as the shift register 43. In other words, the shift register 44M has a length along the columnar direction equivalent to the "L" number of bits and a width along the raster direction equivalent to the "N" (four, in this example) number of bits. The delay circuit 44C may be constructed from another shift register which has a length along the columnar direction equivalent to the "L" number of bits and a width along the raster direction equivalent to the "2N" (eight, in this example) number of bits. The delay circuit 44Bk may be constructed from still another shift register which has a length along the columnar direction equivalent to the "L" number of bits and a width along the raster direction equivalent to the "3N" (twelve, in this example) number of bits.

It is now assumed that data is stored in the buffer memories 410Y, 410M, 410C, and 410Bk as shown in FIGS. 4(A) through 4(D). According to the present embodiment, the shift registers 43Y, 43M, 43C, and 43Bk are supplied with data from the buffer memories 410Y, 410M, 410C, and 410Bk as described below. For simplicity and clarity, this description is given only to the first raster.

Figure 8:
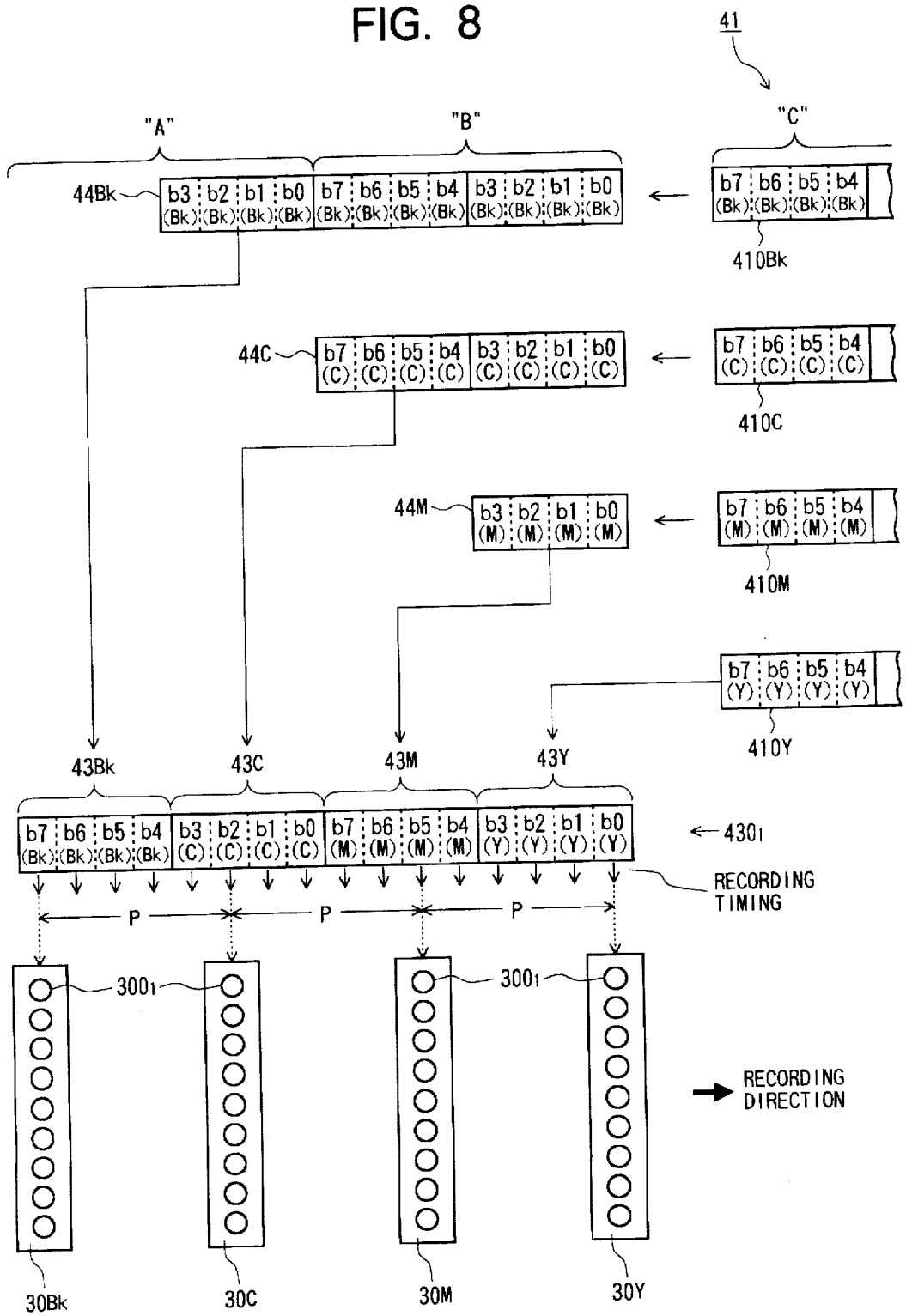
FIG. 8 schematically shows a relationship between recording units 30Y, 30M, 30C, and 30Bk, shift registers 43Y, 43M, 43C, and 43Bk, and delay circuits 44M, 44C, and 44Bk shown in FIG. 7.

In this example, as shown in FIG. 8, the interval P is set to a five-dot interval 5D, that is, a sum of one dot interval and four dot intervals. FIG. 8 also shows how data in the first raster is transferred from the buffer memories 410 to the shift registers 43 and then recorded by the recording units 30. In more concrete terms, FIG. 8 shows how data from the first raster groups in the buffer memories 410Y, 410M, 410C, and 410Bk are transferred and stored into the first storage portions $430_1$ of the shift registers 43Y, 43M, 43C, and 43Bk and then used by the first recording elements $300_1$ of the recording units 30Y, 30M, 30C, and 30Bk.

At one instance of FIG. 8, four bits of data "b3(Y)"–"b0(Y)" for a yellow color component of the letter "B" are stored in the first storage portion $430_1$ of the shift register 43Y. Four bits of data "b7(M)"–"b4(M)" for a magenta color component of the letter "B" are stored in the first storage portion $430_1$ of the shift register 43M. It is noted that four bits of data "b3(M)"–"b0(M)" for the magenta color component of the letter "B" are stored in the delay circuit (shift register) 44M.

Four bits of data "b3(C)"–"b0(C)" for a cyan color component of the letter "A" are stored in the first storage portion $430_1$ of the shift register 43C. It is noted that eight bits of data "b7(C)"–"b0(C)" for the cyan color component of the letter "B" are stored in the delay circuit (shift register) 44C.

Four bits of data "b7(Bk)"–"b4(Bk)" for a black color component of the letter "A" are stored in the first storage portion $430_1$ of the shift register 43Bk. It is noted that four bits of data "b3(Bk)"–"b0(Bk)" for the black color component of the letter "A" and eight bits of data "b7(C)"–"b0(C)" for the black color component of the letter "B" are stored in the delay circuit (shift register) 44Bk.

Similarly to the example of FIG. 5 in the first embodiment, when a timing signal TS is issued in this condition, the data bit "b0(Y)," that is stored last of the four bits in the shift register 43Y, is recorded by the recording element $300_1$ of the recording unit 30Y. At the same time, the data bit "b5(M)," that is stored third of the four bits in the shift register 43M, is recorded by the recording element $300_1$ of the recording unit 30M. The data bit "b2(C)," that is stored second of the four bits in the shift register 43C, is recorded by the recording element $300_1$ of the recording unit 30C. The data bit "b7(Bk)," that is stored first of the four bits in the shift register 43Bk, is recorded by the recording element $300_1$ of the recording unit 30Bk.

After completing the above-described recording operation, the recording unit 30Y will need to store the next series of data "b7(Y)" to "b4(Y)" for the letter "C" before the subsequent timing signal is issued. Accordingly, at the same time of the above-described printing operation with the condition shown in FIG. 8, the CPU 40 transfers the four bits "b7(Y)" to "b4(Y)" of the letter "C" from the buffer memory area 410Y to the shift register 43Y.

Then, at the further next timing, when each recording unit performs recording operation with data subsequent to the latest-recorded data, the CPU 40 transfers four bits "b3(M)" to "b0(M)" for the letter "B" from the delay circuit 44M to the shift register 43M. At the same time, the CPU 40 transfers four bits "b7(M)" to "b4(M)" for the letter "C" from the buffer memory area 410Y to the delay circuit 44M.

As apparent from the above description, the position in the buffer memory 410M, from which the CPU 40 now retrieves the four bits of data "b7(M)"–"b4(M)" for the letter "C", is the same as the position in the buffer memory 410Y, from which the CPU 40 has retrieved the bits of data "b7(Y)"–"b4(Y)" for the letter "C" at the last timing.

Then, at the further next timing, when each recording unit performs recording operation with data subsequent to the latest-recorded data, the CPU 40 transfers four bits "b7(C)" to "b4(C)" for the letter "B" from the delay circuit 44C to the shift register 43C. At the same time, the CPU 40 transfers four bits "b7(C)" to "b4(C)" for the letter "C" from the buffer memory area 410C to the delay circuit 44C.

Then, at the further next timing, when each recording unit performs recording operation with data subsequent to the latest-recorded data, the CPU 40 transfers four bits "b3(Bk)" to "b0(Bk)" for the letter "A" from the delay circuit 44Bk to the shift register 43Bk. At the same time, the CPU 40 transfers four bits "b7(Bk)" to "b4(Bk)" for the letter "C" from the buffer memory area 410Bk to the delay circuit 44Bk.

Thus, timings at which data for the respective colors are retrieved from the buffer memories 410 are shifted by one recording time period T. The positions in the buffer memories, from which data for the respective colors are retrieved, are the same as one another. The delay circuits 44M, 44C, and 44Bk produce delays of 4T (=1×4T), 8T (=2×4T), and 12T (=3×4T) before supplying the data to the shift registers 43M, 43C, and 43Bk, respectively. Accordingly, the data are supplied to the shift registers 43M, 43C, and 43Bk in the same manner as in the first embodiment.

As apparent from the above, also in the second embodiment, the CPU 40 reads, at each timing, data only for a single color from the buffer memories 410. It becomes unnecessary to perform data processes for all the colors at one timing.

It is noted that in the above-described first and second embodiments, each shift register can store only four dots in the raster direction, and the interval P is set to a value (1D+a multiple of 4D), that is, a sum of one dot interval and a multiple of four dot intervals. However, each shift register may be designed to store eight bits of data in the raster direction. In this case, the interval P can be set to a value (2D+a multiple of 8D), that is, a sum of two dot intervals and a multiple of eight dot intervals. It is possible to obtain the same advantages as those obtained when the shift register can store only four dots and the interval P is set to the value (1D+a multiple of 4D).

To summarize, it is sufficient that the interval P be set to a value different from any multiple of the value ND where D is the dot interval and N is the number of bits capable of being stored in each shift register in the raster direction. For example, the interval P may be set to a sum of a multiple of the value ND and another value RD where R is an integer different from the number N. Still in this case, the data reading/recording processes for all the colors will not be performed at a single timing.

It is noted that in the above-described example where N is equal to four or eight, data processes for two colors will be performed at the same timing when the interval P is set to the following values: (2D+a multiple of 4D) and (4D+a multiple of 8D). The interval P is therefore preferably set to a sum of (a multiple of the value ND) and (a value SD), where S is an integer equal to or less than a value which is obtained by dividing the number N by the number of the recording elements 30 aligned in the scanning direction X. In the example where N is four or eight and the four recording elements 300 are aligned along the scanning direction X, the interval P is preferably set to the following values: (D+a multiple of 4D), (2D+a multiple of 8D), and (D+a multiple of 8D). Data processes for any two colors will not be performed at the same timing. It is noted that when the interval P is changed, positions of the buffer memories 410, from which the CPU 40 retrieves data for the respective recording units 30, have to be changed by eight dot units.

While the invention has been described in detail with reference to the specific embodiments thereof, it would be apparent to those skilled in the art that various changes and modifications may be made therein without departing from the spirit of the invention.

In the above-described embodiments, the recording head is of an ink jet type. However, the recording head may be constructed from other various dot matrix type recording heads. For example, the recording head may be of a thermal type in which the recording elements are constructed from heating elements. The recording head may be of an impact type in which the recording elements are constructed from impact pins.

In the above-described embodiments, the recording head is designed to record three primary colors and to record black color. However, the present invention can be applied to multicolor image forming devices for recording any number of colors. The present invention can also be applied to a monochrome image forming device in which a plurality of recording elements are arranged in the scanning direction to cooperate to produce each line.

In the above-described example of the second embodiment, shift registers are employed as the delay circuits 44. However, other various types of delay circuits may be used. It is noted that delay data for determining the delay amounts, which the delay circuits 44 produce, has to be changed when the scanning direction of the recording head is reversed.

As described above, the image forming device of the present invention is provided with a recording head for recording dots in a dot matrix formed with a plurality of recording elements. One of the recording head and a recording medium are successively or repeatedly scanned or moved by the dot interval D relative to each other in a scanning direction. The recording elements are aligned with an interval in the scanning direction. The device is provided with a storage portion capable of storing a plurality of data sets, each data set being for the corresponding recording element. Each data set for the corresponding recording element is constructed from a predetermined number (N) of dots' worth of recording data. The predetermined number of dots' worth of recording data is written all at once in the storage portion. The predetermined number of dots' worth of recording data will successively be supplied to the corresponding recording element and be recorded thereby in the scanning direction. The interval, at which the recording elements are aligned in the scanning direction, is set to a value different from a multiple of the predetermined number of the dot intervals ND.

With the above-described structure, the timings, at which the data sets for the respective recording elements are written to the storage portion, are shifted from one another. The predetermined number of dots' worth of data of each data set is then successively supplied to the corresponding recording element, whereupon the recording element records those data in a dot matrix format in the scanning direction. Accordingly, it becomes possible to shorten the period between successive data recording timings and to enhance the entire recording speed.

In the above-described embodiments, a plurality of storage portions or shift registers are respectively provided to the plurality of recording elements. With this structure, the storage portions are written with data sets for the corresponding recording elements. The timings, at which the data sets are written in the storage portions, are shifted from one another. A data set thus stored in each storage portion is constructed from the predetermined number of dots' worth of recording data. The predetermined number of dots' worth of recording data will be serially supplied to the corresponding recording element.

According to the embodiments, a buffer memory is provided for storing recording data to be supplied to all the recording elements. From the buffer memory, data sets for the respective recording elements are retrieved at timings different from one another. A data set for each recording element is constructed from at least plural dots' worth of recording data to be recorded by the recording element in the scanning direction. All the plural dots' worth of recording data constituting each data set is retrieved at a time from the buffer memory. A shift register or storage portion is provided for each recording element. The shift register is capable of storing a predetermined number (N) of dots' worth of recording data to be recorded by each recording element. Accordingly, the shift register stores therein at least a part of the retrieved plural dots' worth of recording data for each recording element.

With the above-described structure, data sets for the respective recording elements are retrieved from the buffer memory at timings shifted from one another. Then, in correspondence with the shifted timings, parts of the data sets are written to the storage portions for the respective recording elements. The retrieved data set is constructed from a plurality of dots' worth of recording data to be recorded by the corresponding recording element in the scanning direction. Because the storage portion for each recording element can store only the predetermined number (N) of dots' worth of recording data, at least a part of the thus retrieved plurality of dots' worth of data is stored in the storage portion. A data set part, constructed from the predetermined number of dots, is therefore stored in the storage portion. The thus stored predetermined number of dots' worth of recording data will then be successively supplied to the corresponding recording element and will be recorded on the recording medium in a dot matrix format.

Thus, the data set retrieving timings are shifted from one another for the respective recording elements. It therefore becomes possible to shorten the period between the successive recording timings and to enhance the entire recording speed.

When the plurality of recording elements include recording elements for recording three primary colors, the recording head can form a multicolor image on the recording medium.

The interval, at which the recording elements are aligned in the scanning direction, is preferably set equal to a sum of (a multiple of the predetermined number of the dot intervals ND) and (a certain number of the dot intervals RD.) the certain number R being an integer different from the predetermined number N. With this structure, the data set retrieving operations for all the recording elements will not be performed at a single recording timing. Data processing operations for the recording elements will be distributed to a plurality of recording timings. It therefore becomes possible to shorten the period between successive recording timings, and therefore to enhance the recording speed.

The number R is preferably set to an integer S which is equal to or lower than a value obtained by dividing the predetermined number N by the total number of the recording elements arranged in the scanning direction. With this arrangement, data processing operations for any two sets of recording elements will not be performed at the same timing. It becomes possible to further shorten the period between successive recording timings, and therefore to further enhance the recording speed.

It is noted that the recording head records dots at the predetermined time interval or time period T. The recording head is scanned at the dot interval D at the time interval T. In the first embodiment, the data sets for the respective recording elements are retrieved from different positions in the buffer memories. In the second embodiment, the data sets for the respective recording elements are retrieved from the same positions in the buffer memories. However, in the second embodiment, the delay circuits produce a delay before writing the data set parts to the respective recording elements. The delay amount corresponds to a multiple of the predetermined number "N" of the time interval NT.

What is claimed is:

1. An image forming device for forming images on a recording medium, the device comprising:

a recording head for recording dots in a dot matrix form with a plurality of recording elements;

scanning means for scanning one of the recording head and a recording medium relative to each other in dot intervals in a scanning direction, the recording elements being aligned with an interval in the scanning direction;

storage means capable of storing a plurality of data sets, each data set being for a corresponding one of the plurality of recording elements, each data set including a predetermined number of dots' worth of recording data which are to be successively supplied to the corresponding recording element and recorded by the corresponding recording element in the scanning direction, the interval, at which the recording elements are aligned along the scanning direction, being different from a multiple of the predetermined number of the dot intervals; and writing means for writing, in the storage means, the data sets for the plurality of recording elements at timings shifted from one another.

2. An image forming device as claimed in claim 1, wherein the writing means writes the predetermined number of dots' worth of recording data constituting each data set, all at once in the storage means, the writing means writing the plurality of data sets in the storage means at timings shifted from one another.

3. An image forming device as claimed in claim 1, wherein the storage means includes a plurality of storage portions each being provided for a corresponding recording element.

4. An image forming device as claimed in claim 1, wherein the plurality of recording elements include recording elements for recording three primary colors, each of the plurality of data sets including the predetermined number of dots' worth of recording data for recording the predetermined number of dots in corresponding one of the three primary colors.

5. An image forming device as claimed in claim 1, wherein the interval, at which the plurality of recording elements are aligned in the scanning direction, is equal to a sum of a multiple of the predetermined number of the dot intervals and another predetermined number of the dot intervals, the other predetermined number being different from the predetermined number.

6. An image forming device as claimed in claim 5, wherein the other predetermined number is an integer equal to or lower than a value obtained by dividing the predetermined number by the total number of the plurality of recording elements aligned in the scanning direction.

7. An image forming device as claimed in claim 1, wherein each of the plurality of recording elements includes an ink jet type recording element for ejecting an ink droplet to the recording medium.

8. An image forming device as claimed in claim 1, further comprising buffer memory means for storing recording data to be supplied to the plurality of recording elements, the writing means reading out the data sets for the plurality of recording elements from the buffer memory at timings shifted from one another and writing the data sets to the storage means, the writing means reading out the data sets for the recording elements from different positions in the buffer memory.

9. An image forming device for forming images on a recording medium, the device comprising:

a recording head for recording dots in a dot matrix form with a plurality of recording elements;

scanning means for repeatedly moving one of the recording head and a recording medium relative to each other by a certain dot interval in a scanning direction, the recording elements being aligned with an interval in the scanning direction;

buffer memory means for storing recording data to be supplied to the plurality of recording elements;

read out means for reading out a plurality of data sets for the plurality of recording elements from the buffer memory at timings shifted from one another, each data set being constructed from a first predetermined number of dots' worth of recording data for a corresponding recording element; and storage means capable of storing a second predetermined number of dots' worth of recording data for each recording element, the second predetermined number being less than the first predetermined number, the storage means storing at least a part of the retrieved first predetermined number of dots' worth of recording data for each recording element, the interval, at which the recording elements are aligned, being different from a multiple of the second predetermined number of the dot intervals.

10. An image forming device as claimed in claim 9, wherein the read out means reads out the data sets for the recording elements from different positions in the buffer memory means.

11. An image forming device as claimed in claim 9, wherein the read out means reads out the first predetermined number of dots' worth of recording data constituting each data set, all at once from the buffer memory means, the read out means reading out the plurality of data sets from the buffer memory means at timings shifted from one another.

12. An image forming device as claimed in claim 9, wherein the storage means includes a plurality of storage portions each being provided for a corresponding recording element.

13. An image forming device as claimed in claim 9, wherein the plurality of recording elements include recording elements for recording three primary colors, each of the plurality of data sets including the first predetermined number of dots' worth of recording data for recording the first predetermined number of dots in corresponding one of the three primary colors.

14. An image forming device as claimed in claim 9, wherein the interval, at which the plurality of recording elements are aligned in the scanning direction, is equal to a sum of a multiple of the second predetermined number of the dot intervals and a third predetermined number of the dot intervals, the third predetermined number being different from the second predetermined number.

15. An image forming device as claimed in claim 14, wherein the third predetermined number is an integer equal to or lower than a value obtained by dividing the second predetermined number by the total number of the plurality of recording elements aligned in the scanning direction.

16. An image forming device as claimed in claim 9, wherein each of the plurality of recording elements includes an ink jet type recording element for ejecting an ink droplet to the recording medium.

17. An image forming device as claimed in claim 9, wherein the recording head records dots at a predetermined record time interval, and the scanning means scans one of the recording head and the recording medium relative to each other at the dot interval at the predetermined record time interval, wherein the read out means reads out the data sets for the recording elements from the same positions in the buffer memory means at the shifted timings, and further comprising delay means for providing delays before writing the data set parts for the respective recording elements, the delay amount being a multiple of the second predetermined number Of the record time interval.

\* \* \* \* \*